United States Patent [19]
Chen et al.

[11] Patent Number: 5,453,780
[45] Date of Patent: Sep. 26, 1995

[54] CONTINOUS PRESENCE VIDEO SIGNAL COMBINER

[75] Inventors: Ting-Chung Chen, Middletown Township; Shaw-Min Lei, Boro of Tinton Falls; Ming-Ting Sun, Holmdel Township, all of Monmouth County, N.J.

[73] Assignee: Bell Communications Research, Inc., Livingston, N.J.

[21] Appl. No.: 234,802

[22] Filed: Apr. 28, 1994

[51] Int. Cl.$^6$ .............................. H04N 1/42; H04N 7/14
[52] U.S. Cl. ................... 348/15; 348/16; 348/14; 375/356
[58] Field of Search ...................... 348/13, 15, 16, 348/578, 584, 588, 14; 358/426; 370/77, 110.1; 375/107, 156; H04N 1/42, 7/14

[56] References Cited

U.S. PATENT DOCUMENTS

| | | | |
|---|---|---|---|
| 4,282,400 | 8/1981 | Ribera et al. | 178/73 |
| 5,257,113 | 10/1993 | Chen et al. | 358/426 |
| 5,315,633 | 5/1994 | Champa | 348/16 |
| 5,323,455 | 6/1994 | Nakatsuka | 348/15 |
| 5,325,194 | 6/1994 | Natori et al. | 348/15 |
| 5,365,265 | 11/1994 | Shibata et al. | 348/15 |

OTHER PUBLICATIONS

CCITT Study Group XV—Report R 93, Draft new Recommendation H.231, "*Multipoint Control Units for Audiovisual Systems Using Digital Channels Up to 2 Mbit/s,*" May 1992.
CCITT Study Group XV—Report R 94 Draft new Recommendation H.243, "*Procedures for Esatablishing Communication Between Three or More Audiovisual Terminals Using Digital Channels Up to 2Mbit/s,*" Audiovisual Systems Using Digital Channels Up to 2 Mbits/s, May 1992.
CCITT Study Group XV—Report R 95 Draft revised Recommendation H.261, "*Vidoe Codec for Audiovisual Services at px 64 kbits/s.,*" May 1992.

*Primary Examiner*—James J. Groody
*Assistant Examiner*—Glenton B. Burgess
*Attorney, Agent, or Firm*—Leonard Charles Suchyta; James W. Falk

[57] ABSTRACT

Four QCIF video input signals generated by participants in a multiparty video conference are combined in the coded domain to produce a merged CIF video output signal. When the CIF video output signal is transmitted back to each party's video terminal, a combined 2×2 image is displayed. A video signal combiner (700) combines the input video signals in the coded domain by time-division multiplexing the inputs at the GOB level. In order to maintain frame synchronization between the inputs which may be arriving at different frame repetition rates, the combiner stores the inputs in buffers (706–709) and processes (710) the temporal reference (TR) numbers associated with each frame in each input before merging the GOBs from each input in accordance with the processed TR number. Specifically, the TR of each input is offset by an initial TR number associated with each input and determined at turn-on. The offset TR in each input is then mapped onto a scale of TR numbers that is common to each input. The each output frame is formed by time-division multiplexing GOBs from the inputs that have the same offset and mapped TR number. Only GOB headers and empty data fields are inserted into the combined data stream for those inputs not having a frame with that same mapped TR number.

22 Claims, 8 Drawing Sheets

| GOB 1 |
|---|
| GOB 3 |
| GOB 5 |

FIG. 3

| GOB 1 | GOB 2 |
|---|---|
| GOB 3 | GOB 4 |
| GOB 5 | GOB 6 |
| GOB 7 | GOB 8 |
| GOB 9 | GOB 10 |
| GOB 11 | GOB 12 |

FIG. 4

| | | |
|---|---|---|
| QCIF I | GOB 1 (S11) | GOB 2 (S21) | QCIF II |
| | GOB 3 (S12) | GOB 4 (S22) | |
| | GOB 5 (S13) | GOB 6 (S23) | |
| QCIF III | GOB 7 (S31) | GOB 8 (S41) | QCIF IV |
| | GOB 9 (S32) | GOB 10 (S42) | |
| | GOB 11 (S33) | GOB 12 (S43) | |

QCIF I

TR = 10, 16, 20, 25, ...

↓ OFFSET = 10

0, 6, 10, 15...

↓ MAP 0, 6, 9, 15, ...

QCIF II

TR = 2, 5, 9, 13, 16, 20, 23, ...

↓ OFFSET = 2

0, 3, 7, 11, 14, 18, 21, ...

↓ MAP 0, 3, 6, 9, 12, 18, 21, ...

QCIF III

TR = 3, 6, 9, 13, 20, 24, 27, ...

↓ OFFSET = 3

0, 3, 6, 10, 17, 21, 24, ...

↓ MAP 0, 3, 6, 9, 15, 21, 24, ...

QCIF IV

TR = 2, 8, 12, 17, 25, ...

↓ OFFSET = 2

0, 6, 10, 15, 23, ...

↓ MAP 0, 6, 9, 15, 21, ...

CONTINOUS PRESENCE VIDEO SIGNAL COMBINER

BACKGROUND OF THE INVENTION

This invention relates to digital video signal processing, and more particularly to the combining of plural digitally coded video input signals on a real time basis to produce an output digital video signal which, when decoded, merges the plural input signals into a single video image.

Video-conferencing through ISDN or Ethernet is becoming more and more popular. With the widespread availability of Desktop Video Conferencing systems, people can dial-up and see a remote party using their own PCs or workstations. However, currently available point-to-point video-conferencing lacks the capability of providing multipoint video-conferencing. A multipoint video-conference emulates a real conference more closely, hence the evolution from two-point to multipoint is a natural trend. Since the video signals are transmitted in coded digital compressed format, in order to set up multipoint connections, a multipoint control unit (MCU) is needed to handle all the coded video bit-streams which the participants' codecs generate. In first generation MCUs, only one received video bit-stream is selected and transmitted to each participant based either on the audio signal level or "chairman" switching controls. This is referred to as the "switched presence" MCU and has been standardized recently by the CCITT Study Group XV (now ITU-T SG15)(CCITT Study Group XV— Report R 93, Draft new Recommendation H.231, Multipoint control units for audiovisual systems using digital channels up to 2 Mbit/s, May 1992; CCITT Study Group XV—Report R 94, Draft new Recommendation H.243, Procedures for establishing communication between three or more audiovisual terminals using digital channels up to 2 Mbit/s, May 1992). In such MCUs, video data does not have to be processed, making realization easier.

In many situations viewing only one location at a time is too restrictive and it is desirable to see multiple parties all the time on a real time basis using a split-screen. For example, it is advantageous for a teacher lecturing to multiple remote students/classrooms to see each student/classroom simultaneously rather than just one student/classroom at a time. Also, in a multiparty video conference, it is preferable from an information flow standpoint for the parties to see multiple selected participants simultaneously on a split-screen rather than just one party whose one image fills the entire screen. An MCU that combines multiple signals is referred to as a "continuous presence" MCU. One way that a continuous presence MCU can operate is by performing pel(pixel element)-domain video mixing, hereafter referred to as "transcoding." In transcoding, coded video sources are fully decoded and combined in the pel domain. The resultant compound picture is encoded again and distributed to each participant. Such decoding, combining in the pel domain, and encoding introduces additional delay, degradation to the signal, and results in significant codec expense at the MCU. Specifically, the CCITT standard H.320 terminal used for point-to-point video-conferencing, which would also be used for multiparty video-conferencing, incorporates G-series audio coders (G.711, G.722 or G.723) for coding the audio signal; an H.261 video codec for coding the video signal into a signal having a rate of p×64 kbits/sec; an H.230/H.242 end-to-end signaling and call setup protocol processor which informs the opposite end of the capabilities of the transmitter (e.g., maximal allowable frame rates); and an H.221 multiplexer which multiplexes the outputs of the G-series audio coder, the H.261 codec and the H.230/H.242 protocol processor coder into one bit stream. In order for a continuous presence MCU to combine plural inputs received from an H.320 terminal in the pel domain, it would require that same plural number of terminals to decode each signal, buffers to store each input, a processor to synthesize a new picture from the inputs, and another H.320 terminal to transmit the merged coded video signal back to each of the parties. Since the cost of an H.320 terminal is today in the order of $20,000, such an MCU would likely be considerably expensive and would further impose the aforenoted picture degradation and delay.

Figure 1:
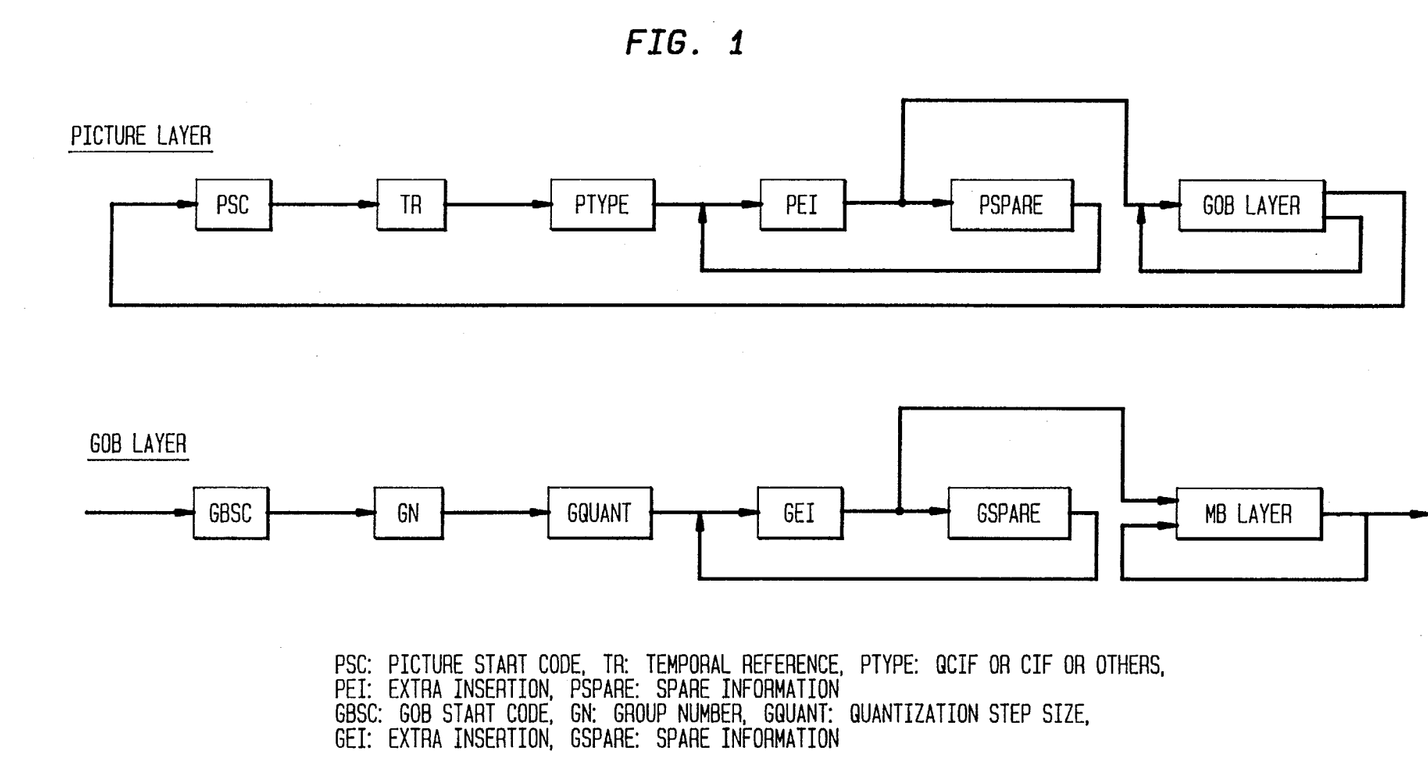
FIG. 1 shows the top two layers of the H.261 syntax.
Figure 2:
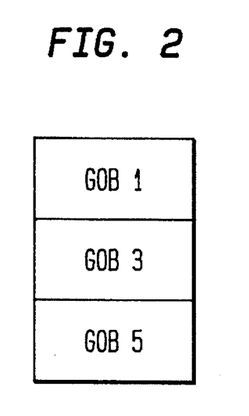
FIG. 2 shows the three GOBs that form the QCIF video picture.
Figure 3:
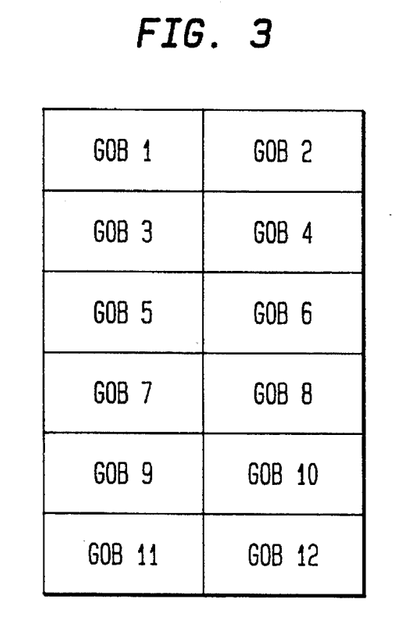
FIG. 3 shows the twelve GOB s that form the CIF video picture.
Figure 4:
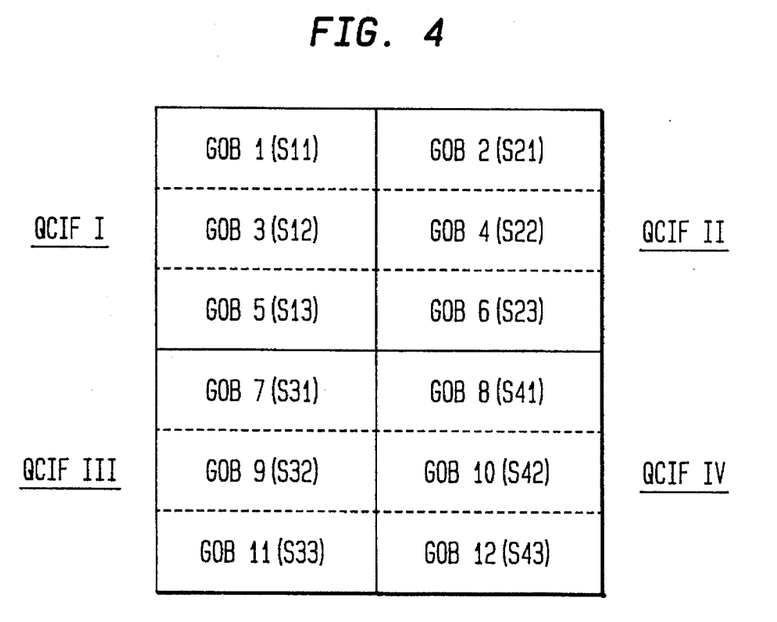
FIG. 4 shows how four QCIF pictures are combined to form a CIF video picture.

An alternative to transcoding is coded-domain video combining, hereafter referred to as "combining." Video combining in the coded domain advantageously offers shorter end-to-end delay, better picture quality, and lower MCU cost. Real-time video combining in the coded domain is possible if the incoming video bit-streams follow the syntax of the H.261 standard (CCITT Study Group XV—Report R 95, Draft revised Recommendation H.261, Video Codec for Audiovisual Services at p×64 kbit/s, May 1992). In accordance with the H.261 syntax, the top two layers of which are shown in FIG. 1, an H.261 coded bit stream is composed of pictures (video frames) that start with a picture start code (PSC) and are followed by a temporal reference number (TR) that indicates a frame sequence number, and are then followed after several other code words with several Groups of Blocks (GOBs) of data. An H.261 coder can transmit a coded picture in either a Quarter Common Intermediate Format (QCIF) consisting of 176 horizontal pels×144 scan lines, or in a Common Intermediate Format (CIF) consisting of 352 horizontal pels×288 scan lines. There are three GOBs, numbered 1, 3, and 5, as shown in FIG. 2, in a QCIF coded picture, each GOB consisting of eleven horizontal by three vertical macro blocks of pel data, wherein each macro block consists of four luminance blocks. Each CIF coded picture consists of twelve GOBS, numbered 1–12, as shown in FIG. 3 and two chrominance blocks. Each block consists of 8×8 pels. Four QCIF data streams from up to four video-conference participants can thus be combined into one CIF as shown in FIG. 4. Thus, GOBs 1, 3, and 5, which are sequentially inputted from each of the QCIF inputs, QCIF I, QCIF II, QCIF III, and QCIF IV, can be renumbered with GOB numbers 1–12, as shown, and outputted sequentially. In FIG. 4, Sij, ($1 \leq i \leq 4$, $1 \leq j \leq 3$) designates the size of the jth coded GOB within QCIF i. The combined coded video signal is then sent back to all the video-conference participants. After decoding by a standard H.320 terminal, each participant simultaneously sees up to four conferees, which may include themselves, on a 2×2 split-screen.

Although combining four QCIF inputs to form a merged CIF output appears to be a straightforward process, in fact it is not because of the characteristics of the coded signal inputs. Since the incoming GOBs in the QCIF inputs are of variable-length due to variable-length encoding of the input video signals (i.e., Sij varies both from frame-to-frame, from QCIF-to-QCIF, and within each QCIF), buffering of the input signals is necessary to store arriving GOBs until they are needed to be placed in the combined output signal. Delay problems can arise when, in forming the CIF output, an input GOB is needed that has not in fact been fully received. Furthermore, and very significantly, depending on the pictorial complexity of a video input, a participant's terminal may in fact not transmit each video frame of data. Each of the participants H.320 terminals has a common maximum allowable transmitting frame rate of 7.5, 10, 15 or 30 frames/sec, determined at call setup by the maximum allowable transmitting frame rate of the participant's terminal with the lowest frame rate capability. A complex video image which generates significantly more bits in its variable-length coded bit stream cannot be transmitted by the terminal at that maximum frame rate within the bit-rate channel capacity of the data link to the MCU. Video frames are thus not transmitted and are dropped. Since the four QCIF data input sequences are likely to have different complexities, and have unequal frame rates, they cannot simply be combined in their input order if the combined output signal is to remain in frame synchronization.

An object of the present invention is to combine coded multiple video signal inputs in real time and in such a manner that the merged output coded video signal maintains frame synchronization.

An additional object of the present invention is to combine coded multiple video signal inputs in real time with minimum delay through the MCU.

SUMMARY OF THE INVENTION

Video combining in the coded domain is performed by the video combiner of the present invention, which receives four QCIF video inputs from four sources, each at a rate of R, to produce a merged CIF video coded output which is transmitted back to each of the inputs at a constant rate 4R. Each QCIF input consists of a data stream that includes for each video frame a picture start code (PSC), a temporal reference (TR) number, and three GOBs of data. Each GOB is preceded in the bit stream by a GOB header comprising a GOB start code header (GBSC) and group number (GN). The video combiner stores each input stream in buffers while a processor parses the data from each input to locate a PSC and extracts the TR number of the frame that follows. If it is the first frame of an input, the TR number is reset to zero and an initial offset is stored by the processor for that input. If it is not the first frame of an input, the recorded initial offset for that input is subtracted from the extracted TR number. For each input the processor maps the resultant TR number of that input onto a common temporal scale having allowable values dependent upon the maximum available common frame rate of the separate inputs from each of the sources and the output frame rate back to each of the sources. The output is formed by time-division multiplexing the stored GOBs from only those inputs having the same mapped TR number, with only GOB headers and empty data fields being inserted in the combined data stream for those inputs not having frames associated with that mapped TR number. GOBs from complex pictures with either greater than normal detail or frame-to-frame motion displacements are likely to be significantly longer than the GOBs from the less complex sources. In forming the multiplexed data stream for output, a particularly long GOB may be needed for output before it has been fully inputted to its buffer and thus available for combining in the multiplexed bit stream. Fill characters are thus inserted in the output bit stream to allow the input to "catch up" while the already received bits in that GOB are outputted. In this way the buffer lengths can be kept shorter than would be needed if a full input frame was required to be available from each source before the merged output was formed. Furthermore and very significantly, the delay in forming the merged output is minimized.

DETAILED DESCRIPTION

Figure 5:
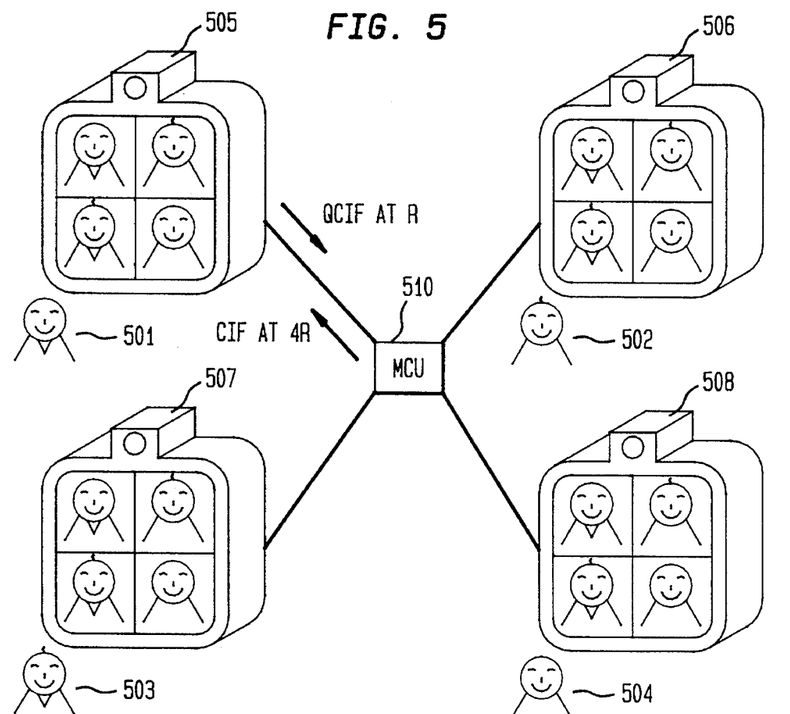
FIG. 5 shows an example of a continuous presence application in which multiple conferees are involved in a multiparty video conference.

With reference to FIG. 5, QCIF digital video signals of four conferees 501–504 are transmitted by terminals 505–508, respectively, to the MCU 510 with a transmission rate R. MCU 510 combines the four QCIF digital video signals in the coded domain to produce a combined output digital video CIF signal that is transmitted back to each conferee at a transmission rate 4R. At each terminal the CIF digital video signal is decoded and displayed on the terminal's monitor. Each conferee thus sees a combined image of all four conferees.

Figure 6:
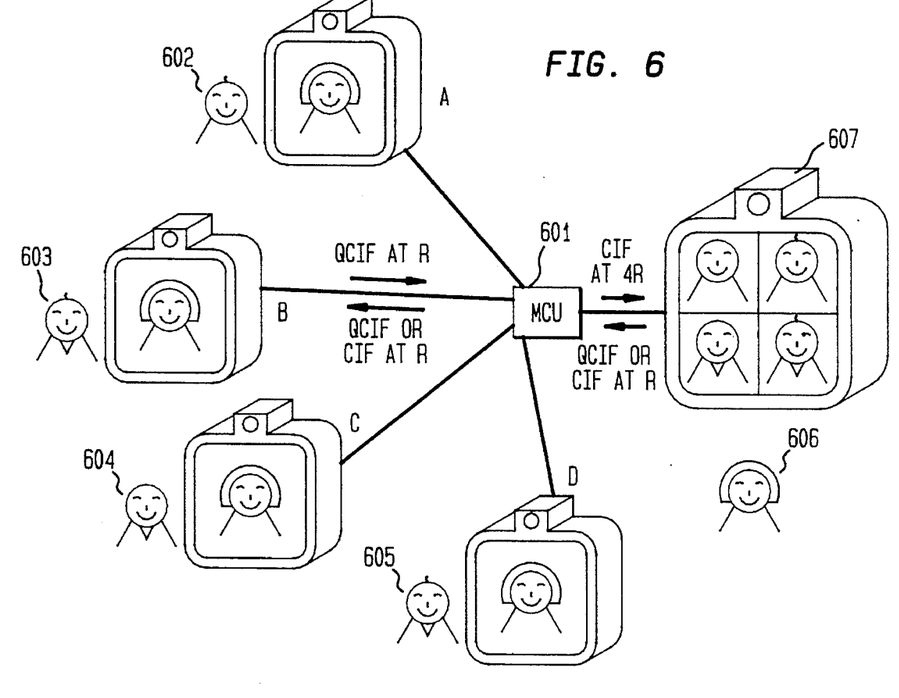
FIG. 6 shows a remote classroom application of continuous presence video combining.

FIG. 6 similarly shows a remote classroom application where MCU 601 combines four QCIF digital video signals of four students 602–605 from four classroom sites that are remote from the site of the teacher 606. MCU 601 combines the four QCIF input video signals, each at rate R, into a CIF digital video signal, at rate 4R, that is transmitted to the teacher's terminal 607, where it is decoded. The teacher can thus see each of the four students simultaneously. In the opposite direction, the video signal from the teacher 606 is digitally transmitted to each of the remote classrooms in either QCIF or CIF at rate R, where it is decoded and displayed on each student's terminal. The teacher can thus see the four students simultaneously while the each student sees and hears the teacher.

Figure 7:
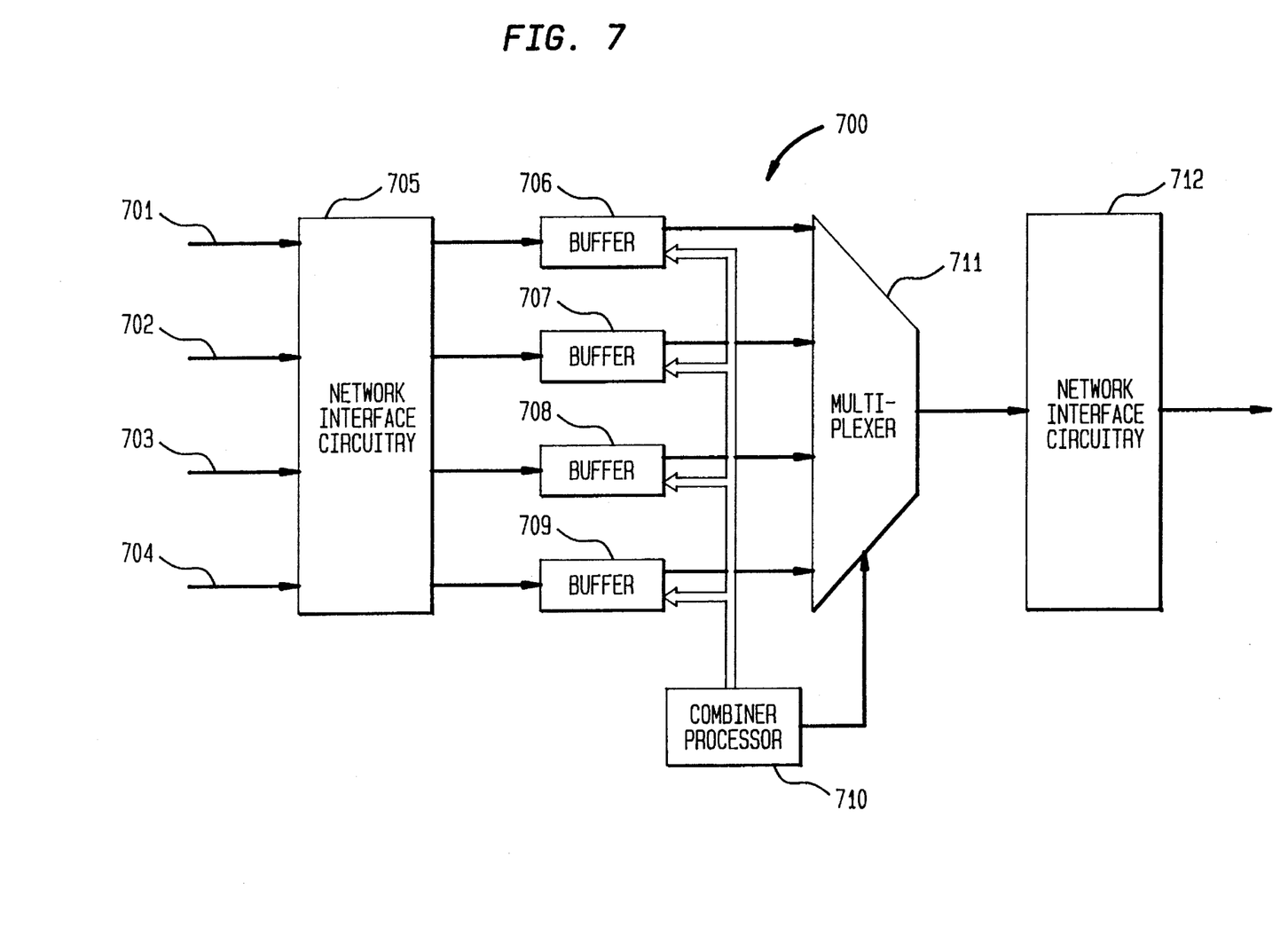
FIG. 7 is a block diagram of the architecture of the continuous presence video signal combiner of the present invention.

With reference to FIG. 7, a schematic block diagram shows the architecture of the MCU or video signal combiner 700 of the present invention. Four digital input streams from the four multiparty video conference participant H.320 terminals (not shown) are inputted on leads 701–704 to network interface circuitry 705. These QCIF digital input video signals, QCIF I, QCIF II, QCIF III and QCIF IV, are transmitted by each conference participant's terminal at a rate R and have the H.221 syntax of that terminal's multiplexer which multiplexes the output of the G-series audio codec, the H.261 video codec and the H.230 coder into one bit stream. Network interface circuitry 705 performs call setup procedures with each of the H.320 terminals, physically linking them together within combiner 700. It further handles all network protocols and polls the frame rate of each of the terminals to determine the lowest common frame-rate capability of the terminals. The H.221 syntax is then peeled-off each input signal. The H.261 syntax (see FIG. 1) is also peeled-off each input signal and inputted to an associated buffer, 706–709. Inputted to each buffer 706–709 is, therefore, a data stream that consists of sequential digital video frames transmitted by the corresponding conference participant's terminal. As can be noted in FIG. 1, each digital video frame consists, in sequence, of a picture start code (PSC), a temporal reference (TR) number for that frame, code words not essential to the understanding of the present invention, and then for each group of blocks in the frame, a GOB start code (GBSC), a group number (GN), other information not relevant herein, and then the GOB data within the group. For the QCIF signal transmitted by each participant's H.320 terminal, each digital frame includes three GOBs, sequentially numbered 1, 3 and 5.

Each of the buffers 706–709 is connected to a combiner processor 710. Combiner processor 710 performs the functions of data parsing, frame synchronization, buffer management and data formatting for output to multiplexer 711. Specifically, processor 710 searches each incoming data stream for a PSC to locate the start of a video frame. TRs are located for performing frame synchronization. Combiner processor 710 then searches for GBSC code words to locate GNs and renumbers the GNs of the incoming GOBs in accordance with the mapping of the four QCIF signals to the CIF signal as shown in FIG. 4. Thus GOB GNs 1, 3 and 5 from QCIF II are renumbered with GNs 2, 4, and 6, respectively; GOB GNs 1, 3 and 5 from QCIF III are renumbered with GNs 7, 9, and 11, respectively; and GOB GNs 1, 3 and 5 from QCIF IV are renumbered with GNs 8, 10 and 12, respectively. The GOB GNs from QCIF I do not have to be renumbered since they maintain their same GN in the combined CIF output signal.

Processor 710 then retrieves from buffers 706–709 the GOBs with GNs 1–12 which multiplexer 711 combines in a time-division multiplexed manner to form the combined CIF signal which is formatted in the H.261 syntax. Specifically, the GOB with GN 1 from QCIF I is outputted from buffer 706, followed by the renumbered GOB with GN 2 from QCIF II in buffer 707, followed by the GOB with GN 3 from QCIF I from buffer 706, followed by the renumbered GOB with GN 4 from QCIF II from buffer 707, followed by the GOB with GN 5 from QCIF I from buffer 706, followed by the renumbered GOB with GN 6 from QCIF II from buffer 707. These GOBs are then followed by the renumbered GOB with GN 7 from QCIF III from buffer 708, followed by the renumbered GOB with GN 8 from QCIF IV from buffer 709, followed by the renumbered GOB with GN 9 from QCIF III from buffer 708, followed by the renumbered GOB with GN 10 from QCIF IV from buffer 709, followed by the renumbered GOB with GN 11 from QCIF III from buffer 708, and followed by the renumbered GOB with GN 12 from QCIF IV from buffer 709.

Multiplexer 711 outputs a single CIF digital video signal in the H.261 syntax comprising the combined and regrouped GOBs. The output of multiplexer 711 is connected to network interface circuitry 712 which converts the H.261 syntax digital video signal into the H.221 syntax, which includes the audio signal, for transmission back to each of the conference participant's terminals at a rate 4R.

As described, the GOBs in each QCIF input are renumbered and regrouped to form the output CIF video signal. Combining GOBs cannot simply be done, however, without considering both buffer management and frame synchronization procedures. With respect to buffer management, each buffer 706–709 can be configured to be large enough to hold at least a maximum size video frame of data, with an output frame being formed only after all data necessary to form that output frame is received. Such an arrangement would, however, require large buffers to accommodate frame lengths which can vary significantly depending upon the complexity of the picture. Furthermore, such an arrangement would impart an undesirable delay in processing the combined video frame and transmitting it back to each of the conference participants. Such a delay would deleteriously affect the ability of the conference participants to interact in a natural manner. Rather, for reduced buffer size requirements and improved delay performance, the GOBs inputted to buffers 706–709 are processed to the combined output stream as they are needed. In formatting the combined output bit stream, however, processor 710 may call for a particular GOB to be inserted in the output bit stream before is has in fact been fully inputted to a buffer. In that case, therefore, "stuff" bits are inserted in the output stream to allow additional bits of the needed GOB to be inputted into its buffer and outputted into the combined output signal.

As previously noted, the H.261 syntax of each digital frame includes a TR number that follows each PSC. That TR number is incremented in each transmitted frame in the bit stream outputted by each terminal. These frame-to-frame TR increments between successive frames in each digital video picture bit stream depend on two factors. Specifically, in accordance with the H.261 definition (sec. 4.2.1), temporal reference is defined as ". . . a five bit number which can have 32 possible values. It is formed by incrementing its value in the previously transmitted picture header by 1 plus the number of non-transmitted pictures (at 29.97 Hz) since that last transmitted one . . . " Also, in sec. 3.1 of H.261, the following is specified: ". . . Means shall be provided to restrict the maximum picture rate of encoders by having at least 0, 1, 2, or 3 non-transmitted pictures between transmitted ones . . . " If the maximum frame rate capability of a terminal is 30 frames/sec, TR increments of 1 or more between successive frames are permissible in the digital stream. Similarly, for a maximum frame rate capability of 15 frames/sec, TR increments of 2 or more are permissible, for a maximum frame rate capability of 10 frames/sec TR increments of 3 or more are permissible, and for a maximum frame rate capability of 7.5 frames/sec TR increments of 4 or more are permissible, which as per the standard is 0, 1, 2, or 3 non-transmitted pictures, respectively, between transmitted pictures. As previously described, when the complexity of any of the input video pictures is high, the actual frame transmission rate of the terminal transmitting that coded video signal may fall below that terminal's frame rate capability. For example, if a terminal has a frame rate capability of 10 frames/sec for which the minimum TR increment per the Standards definition is 3, a TR sequence of 0,3,6,9,12,15,18, . . . satisfies the Standards requirement since there are two nontransmitted pictures between each of the transmitted pictures. The actual sequence of frames transmitted by a conference participant's terminal and received by combiner 700 may, however, be 0,4,9,13,18, . . . in which the number of nontransmitted pictures transmitted pictures is greater than 2. This indicates that the complexity of the transmitted picture is high and that more bits per frame needed to be transmitted than could be accommodated at that frame rate on a channel having a capacity R.

As noted, each of the multiparty conference H.320 terminals transmitting to the signal combiner 700 is polled and a common maximum frame rate is determined. The actual frame rates, however, of the video frames transmitted from the four terminals to the signal combiner 700 are likely to be at rates different than that common maximum rate because of the different complexities of each input picture. Furthermore, the arriving frames will not be synchronized with each other. Therefore, the initial TR numbers at system turn-on from each of the inputs will not be the same and the interframe spacing of nontransmitted pictures between transmitted pictures will vary from input to input. Thus, for example, for a maximum frame rate of 10 frames/sec, the QCIF I input signal may consist of frames that arrive having sequential TR numbers of 10, 16, 20, 25, . . . , the QCIF II input signal may simultaneously consist of frames that arrive having sequential TR numbers of 2, 5, 9, 13, 16, 20, 23 . . . , the QCIF III input may consist of frames that arrive having sequential TR numbers of 3, 6, 9, 13, 20, 24, 27, . . . and the QCIF IV input may consist of frames that arrive having sequential TR numbers of 2, 8, 12, 17, 25, . . . The GOBs in the incoming QCIF signals thus need to be combined properly in a manner that does not skip the data in any input signal and that does not require excessive buffering. The temporal reference mapping scheme described hereinbelow achieves frame synchronization effectively.

Figure 8:
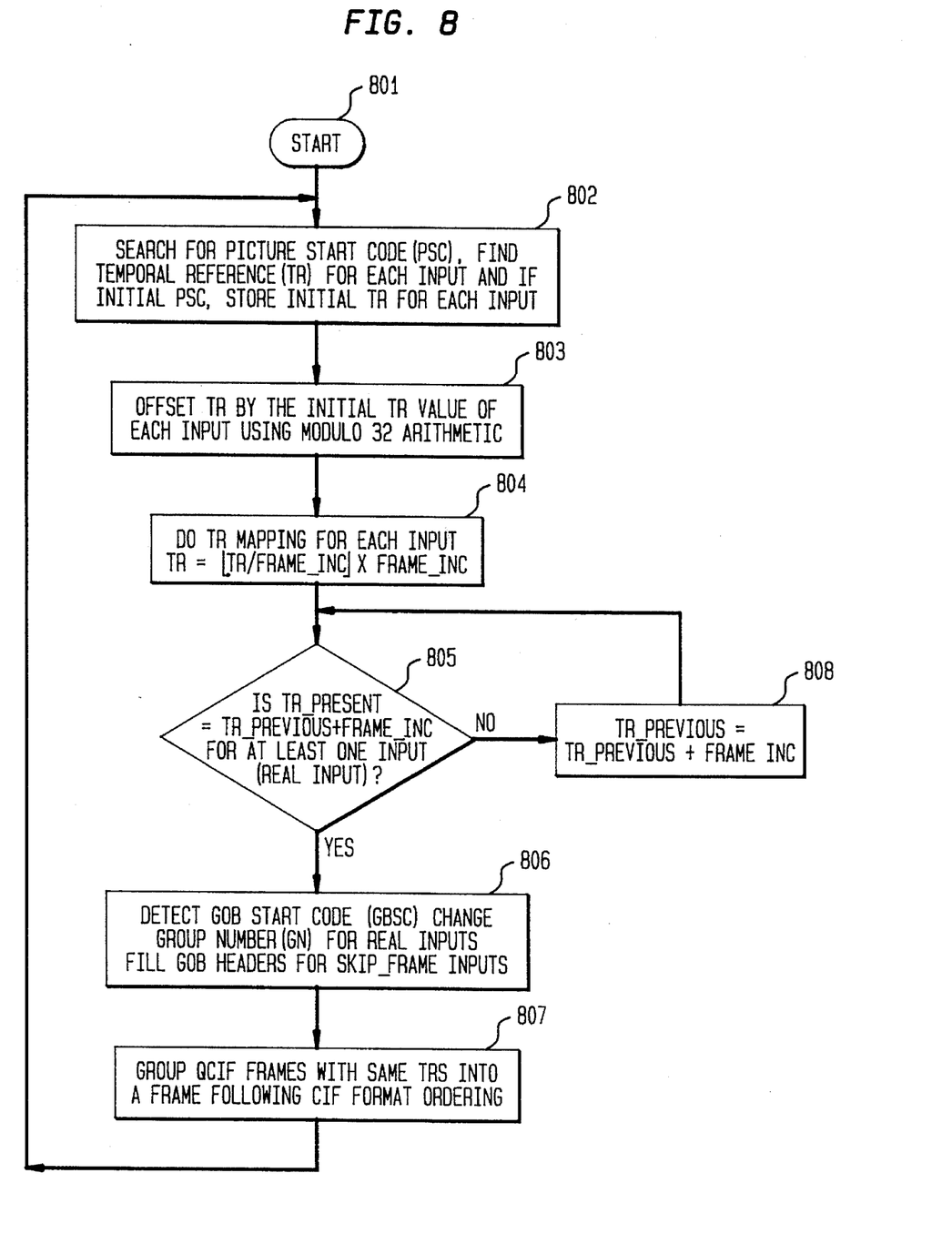
FIG. 8 is a flow chart detailing the steps performed by the combiner of FIG. 7 in forming the combined video signal in the coded domain so that the frames from each input remain in time-synchronization.

FIG. 8 details the steps performed by processor 710 in combining the GOBs from each of the QCIF digital frame inputs arriving and being input to buffers 706–709. Following system turn-on at start step 801, each input stream is searched for a PSC and the initial TR is stored for each input. If not at startup, the PSC is located and the associated TR of the frame is found (step 802). At step 803 the TR of each input is offset by the initial TR using modulo 32 arithmetic. Thus the initial TR of each input is set to 0 and the TRs of subsequent frames are shifted by the same amount in modulo 32 arithmetic. At step 804, the shifted TR of each frame in each input is mapped according to the following:

$$TR = \lfloor TR/frame\_inc \rfloor \times frame\_inc \quad (1)$$

where frame_inc is the minimum allowable frame increment for the common frame-rate capability of all the input terminals, and where $\lfloor x/y \rfloor$ is the largest integer in x/y. Equation (1) thus maps each shifted TR onto a scale having only selected allowable values which are common to all inputs and which also satisfy the minimum allowable frame increment requirement.

Once TR mapping of each input flame is performed, the output merged frames are formed by combining, in a time-division multiplexed manner, GOBs from the four inputs that have the same mapped TR number. At step 805 it is determined whether any of the inputs have a current (mapped) TR number, TR_present, equal to the TR of the previously combined frame plus the frame increment (TR_previous+frame_inc). If yes, then for each that have that TR_present, the GOB start code, GBSC, is detected and the GNs for each GOB from that input are changed according to FIG. 4. If one or more, but less than all, of the inputs does not have a mapped TR equal to TR_present, then GOB headers are created for those skipped (skip_frame) inputs. At step 807 then, the GOBs are grouped together and combined by multiplexer 711 in FIG. 7 in the order shown in FIG. 4 to form a CIF coded video signal having 12 GOBs and a TR number equal to the common mapped TR number of all its QCIF inputs. For those inputs not having that TR number, only the GOB headers are inserted by multiplexer 711 in the combined time-division multiplexed CIF signal. The receiver of each of the conference participant's H.320 terminals repeats the information from the previously received frame for that portion of the decoded video image in which only GOB headers are transmitted by video combiner 700.

At step 805, if none of the inputs has a mapped TR equal to TR_previous+frame_inc, then at step 808, TR_previous is updated to TR_previous+frame_inc and the method returns to step 805 to determine whether there is at least one input having a TR_present equal to this updated TR_previous+frame_inc.

After a CIF output frame is complete (step 807), combiner processor 710 goes back to step 802 to search for the next PSCs and TRs again from each of the inputs. The QCIF inputs are thus continuously processed sequentially in GOB format and moved to the output multiplexer 711 for combining into a CIF signal without decoding and reencoding. The combiner processor waits for the completion of a GOB's transmission before going on to serve the next GOB input. The delay is determined by the largest amount of each input GOB data and the input transmission rate. The overall insertion delay reaches a steady state after encountering the largest GOB data. This steady state delay limits the size of input buffers.

Figure 9:
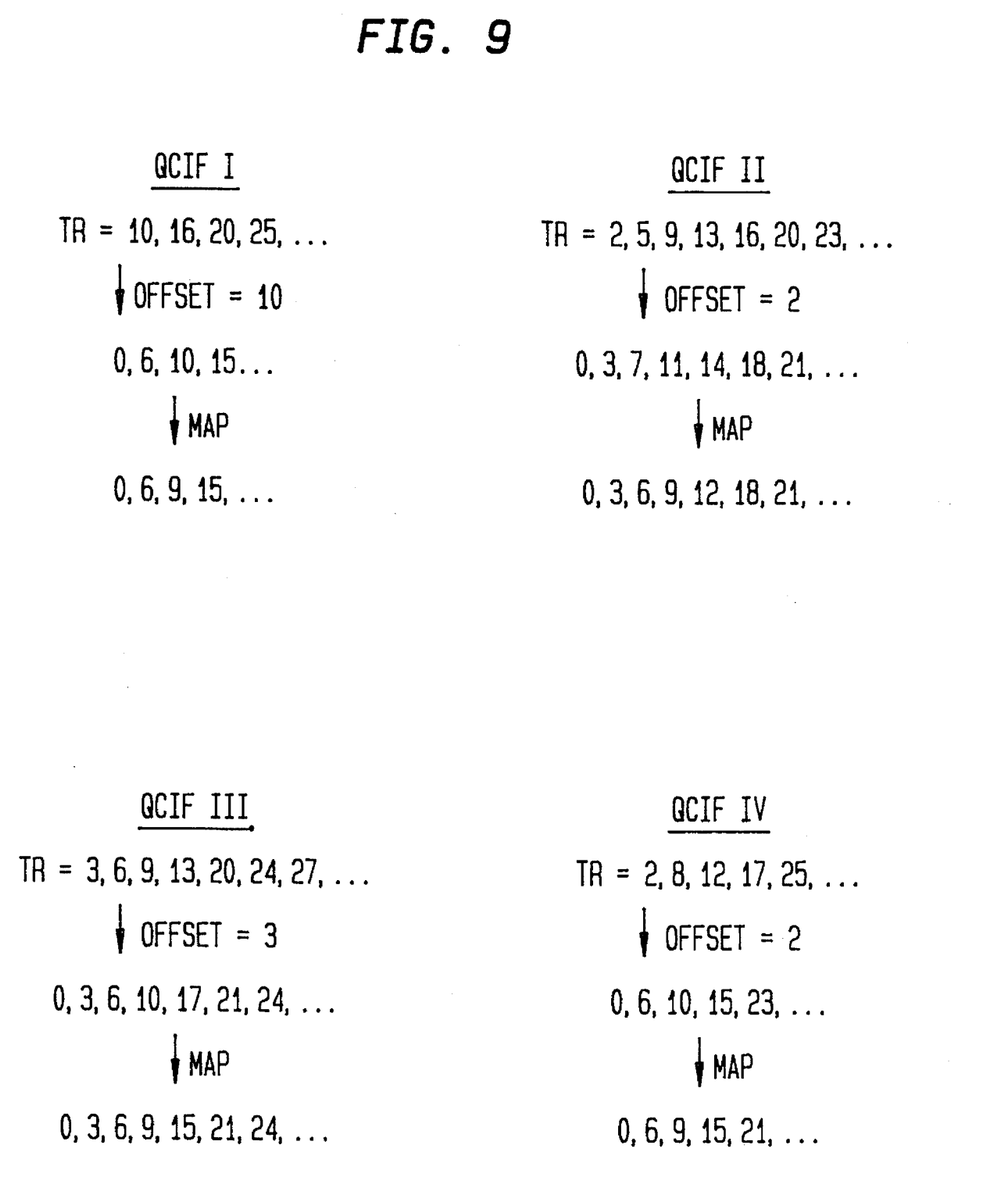
FIG. 9 shows a numerical example of how the TR numbers of sequentially arriving frames in four incoming digital QCIF video signals are mapped to a common TR number reference line.
Figure 10:
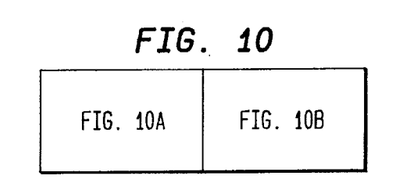
FIGS. 10A and 10B when placed side-by-side as illustrated in FIG. 10, show how the GOBs in the four incoming digital QCIF video signals for the numerical example of FIG. 9 are combined into a single digital CIF output video signal.
Figure 10A:
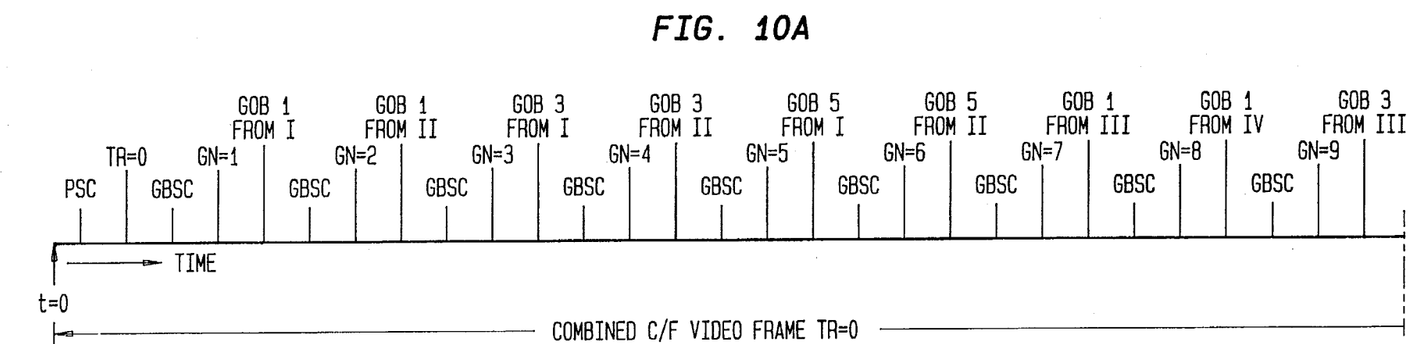
Figure 10B:
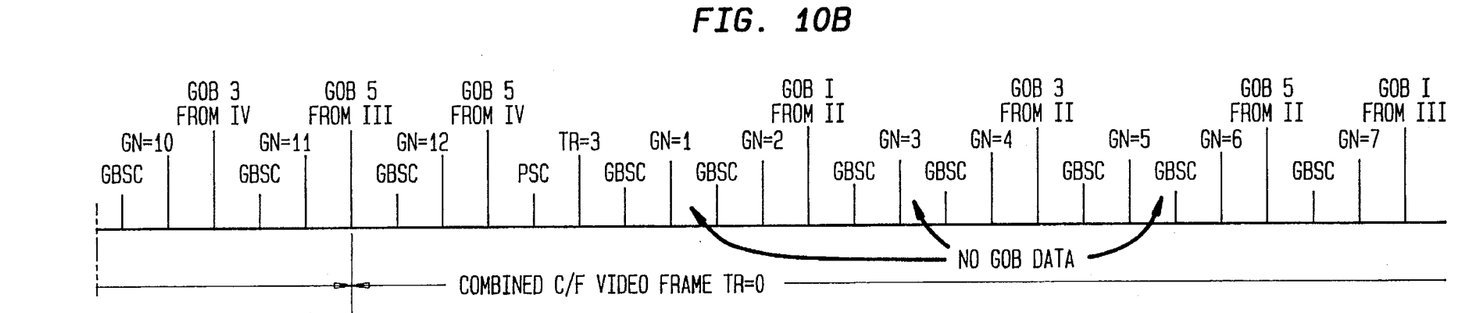

With reference to FIG. 9, an example is presented showing the steps of TR offsetting, mapping and GOB combining for the numerical example discussed hereinabove, wherein the maximum frame rate is 10 frames/sec. As noted in FIG. 9, the QCIF I TR sequence of 10, 16, 20, 25, . . . is offset to 0, 6, 10, 15 . . . , by subtracting 10 from the value of each TR. The offset sequence is then mapped to 0, 6, 9, 15 . . . The QCIF II sequence of 2, 5, 9, 13, 16, 20, 23 . . . , is offset to 0, 3, 7, 11, 14, 18, 21 . . . by subtracting 2 from the value of each TR. The offset sequence is then mapped to 0, 3, 6, 9, 12, 18, 21, . . . The QCIF III and QCIF IV sequences are similarly offset and mapped, as shown in the figure. The combined output is then formed, as shown in FIGS. 10A and 10B, by combining the GOBs from the frames having common offset and shifted TRs in the order shown in FIG. 4. The output thus consists at the picture layer of PSC followed by TR=0, followed by a PTYPE code word indicating CIF. The GOB layer then consists of the GBSC header followed by GN=1 and the GOB data from GOB 1 in QCIF I, followed by the GBSC header and GN=2 and the GOB data from GOB 1 in QCIF II which is now renumbered GOB 2, followed by the GBSC header and GN= 3 and the GOB data from GOB 3 in QCIF I followed by GBSC header and GN=4 and the GOB data from GOB 3 in QCIF II which is now renumbered GOB 4, etc., as shown in FIGS. 10A and 10B. The next frame having TR=3 is then similarly formed. However, since only the QCIF II and QCIF III inputs have frames with TR=3, only GOBs from QCIF II and QCIF III am shifted into the multiplexed output and only headers from QCIF I and QCIF IV are included in the CIF output signal. At the GOB layer, therefore, header GBSC is followed by GN=1 with no following GOB data. Thus, GN=1 is followed by header GBSC and GN=2 and the associated GOB data from QCIF II. Each time the multiplexed output frame calls for a GOB from QCIF I or QCIF IV, therefore, the GBSC header and the appropriate GN number is inserted in the output with an empty set of GOB data. Thus, each GN header associated with data from QCIF I and QCIF IV is followed by an empty set of data.

As previously noted, in forming the CIF multiplexed output video signal from the four QCIF inputs, a GOB may be "called" for insertion into the output before it has been fully inputted into its associated buffer. In order to maintain a constant-rate output channel, processor 710 simply inserts stuff bits within the GOB data being multiplexed into the output to allow the input to "catch-up" to the output.

Figure 11:
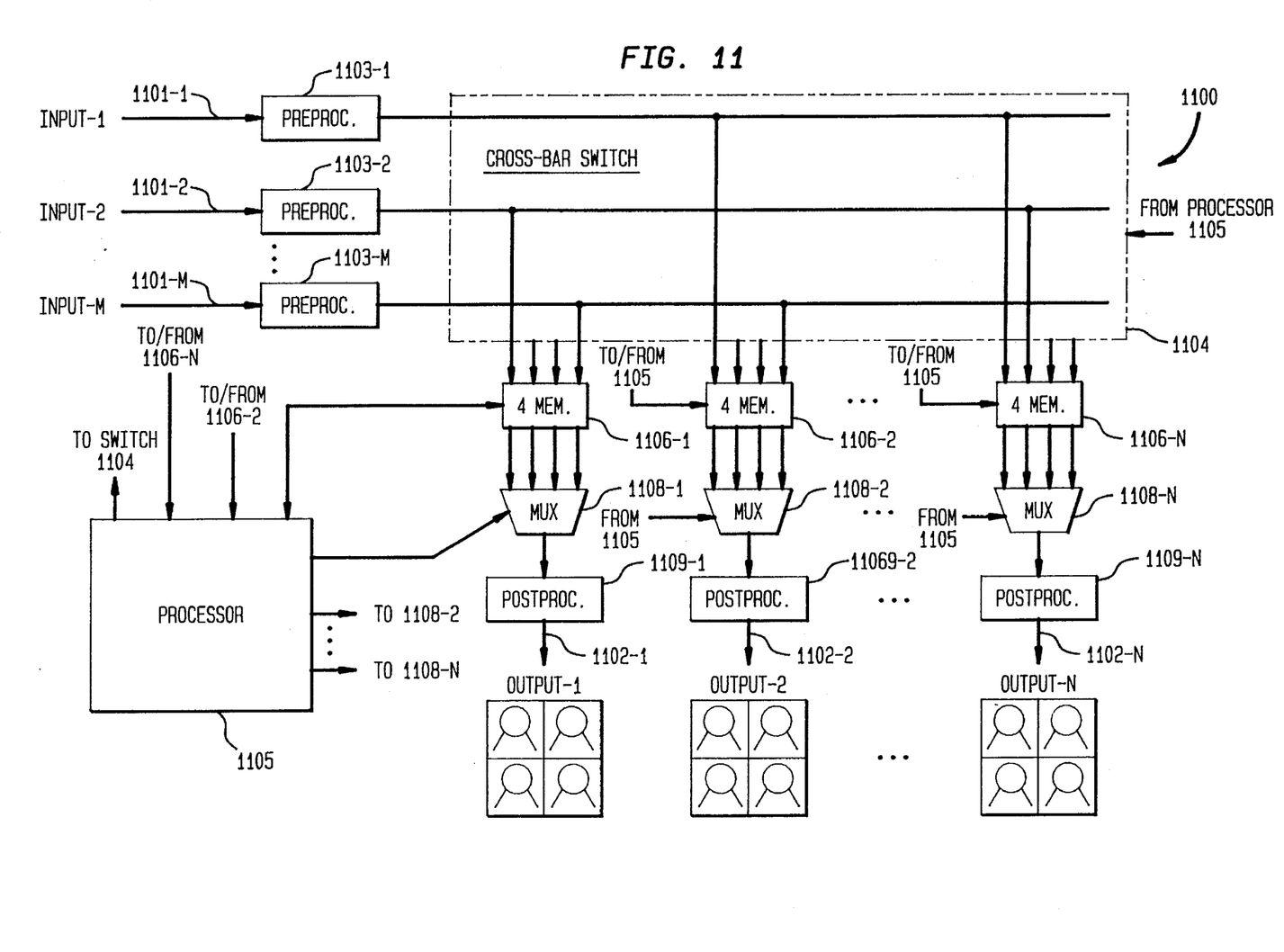
FIG. 11 is a block diagram of a continuous presence video signal combiner in accordance with the present invention in which at each terminal the four combined and displayed video signals are selected from a set of more than four transmitted video signals.

With reference to FIG. 11, the general architecture of a video signal combiner 1100 is shown in which there are M different inputs, 1101-1–110 1-M, and N different customized outputs, 1102-1–1102-N, each comprising a potentially different combination of four of the M inputs. The M preprocessors 1103-1– 1103-M function in the same manner as the network interface circuit 705 in FIG. 7 for preprocessing each input data stream, which includes the functions of end-to-end signaling, H.221 demultiplexing/control, forward error correction and removal of redundant bits. A cross-bar switch 1104, controlled by combiner processor 1105, selects four of M data streams for each output and places them into four buffers 1106-1– 1106-N for each of the N outputs, respectively. Each set of four buffers 1106-i, shown in FIG. 11 as a single element, is equivalent to the four separate buffers 706–709 in FIG. 7. Combiner processor 1105, connected to each of the 4N buffers and to N multiplexers 1108-1– 1108-N, performs the functions of data parsing, frame synchronization, buffer management and data formatting for each of the N outputs in the same manner as processor 710 did for a single output in FIG. 7. Each of the multiplexers, 1108-1–1108-N, combines the four data streams from the associated buffers into a single bit stream and passes it to an associated postprocessor 1109-1–1109-N. Each postprocessor functions as network interface 712 in FIG. 7 to perform the inverse functions of the preprocessors 1103, which include bit stuffing, H.221 multiplexing/control, and forward error correction.

The present invention has been described hereinabove in conjunction with the combining of four digital QCIF input video signals into a single digital CIF output video signal. The present invention could also be used for combining frames of video signals having other formats but which include temporal coding processing between frames, such as the temporal reference numbers used in the H.261 syntax described above. The invention is not limited to signals having the H.261 syntax, however. Furthermore, the present invention could be applied to combining time-segments of plural input signals which have temporal reference or identification numbers associated with each time-segment in each input.

The above-described embodiments are illustrative of the principles of the present invention. Other embodiments can be devised by those skilled in the art without departing from the spirit and scope of the present invention.

What is claimed is:

1. A method of combining segments of plural input signals having temporal reference numbers associated with each segment into an output signal having segments and associated temporal reference numbers, comprising the steps of:

(a) offsetting the temporal reference number of each segment in each input signal by an initial number associated with each input signal;

(b) mapping the offset temporal reference number of each segment in each input signal onto a scale of temporal reference numbers having selected predetermined possible temporal reference numbers that are common to all the input signals;

(c) combining segments from the input signals that have a same mapped temporal reference number into a segment of the output signal, the segment of the output signal having its associated temporal reference number determined from the same mapped temporal reference number of the segments of the input signals that are combined; and (d) repeating step (c) a plurality of times to form sequential segments of the output signal by combining segments of the input signals for the possible temporal reference numbers.

2. The method of claim 1 wherein the associated temporal reference number of each segment of the output signal is equal to the mapped temporal reference number of the segments of the input signals that are combined in step (c).

3. A method of combining plural input video signals having temporal reference numbers associated with predetermined time-segments of each input video signal into an output video signal having time-segments and associated temporal reference numbers, comprising the steps of:

(a) offsetting the temporal reference number of each time-segment of each input video signal by an initial number associated with each input video signal;

(b) mapping the offset temporal reference number of each time-segment of each input video signal onto a scale of temporal reference numbers having selected predetermined possible temporal reference numbers that are common to all the input video signals;

(c) combining time-segments from the input video signals that have the same mapped temporal reference number into a time-segment of the output video signal, the time-segment of the output video signal having its associated temporal reference number determined from the same mapped temporal reference number of the segments of the input video signals that are combined; and (d) repeating step (c) a plurality of times to form sequential time-segments of the output video signal by combining time-segments from the input video signals for the possible temporal reference numbers.

4. The method of claim 3 wherein the associated temporal reference number of each time-segment of the output video signal is equal to the mapped temporal reference number of the time-segments of the input video signals that are combined in step (c).

5. A method of combining plural digital input video signals having temporal reference numbers associated with frames of each digital input video signal into a digital video output signal having frames and associated temporal reference numbers, comprising the steps of:

(a) offsetting the temporal reference number of each frame in each digital input video signal by an initial number associated with each digital input video signal;

(b) mapping the offset temporal reference number of each frame in each digital input video signal onto a scale of temporal reference numbers having selected predetermined possible temporal reference numbers that are common to all the digital input video signals;

(c) combining frames from the digital input video signals having the same mapped temporal reference number into a frame of the digital output video signal, the frame of the digital output signal having its associated temporal reference number determined from the same mapped temporal reference number of the frames of the digital input video signals that are combined; and (d) repeating step (c) a plurality of times to form sequential frames of the digital output video signal by combining frames from the digital input video signals for the possible temporal reference numbers.

6. The method of claim 5 wherein the associated temporal reference number of each frame of the digital output video signal is equal to the mapped temporal reference number of the frames of the digital input video signals that are combined in step (c).

7. A method of combining four Quarter Common Intermediate Format (QCIF) digital input video signals having three numbered groups of blocks (GOBs) of data per video frame into a Common Intermediate Format (CIF) digital output video signal having twelve numbered GOBs per video frame, each video frame in the digital output video signal having an associated temporal reference number, comprising the steps of:

(a) offsetting the temporal reference number of each frame in each digital input video signal by an initial number associated with each digital input video signal;

(b) mapping the offset temporal reference number of each frame in each digital input video signal onto a scale of temporal reference numbers having selected predetermined possible temporal reference numbers that are common to all the digital input video signals;

(c) combining frames from the digital input video signals having the same mapped temporal reference number into a frame of the digital output video signal, the frame of the digital output signal having its associated temporal reference number determined from the same mapped temporal reference number of the frames of the digital input video signals that are combined; and (d) repeating step (c) a plurality of times to form sequential frames of the digital output video signal by combining frames from the digital input video signals for the possible temporal reference numbers.

8. The method of claim 7 wherein step (c) comprises the steps of:

(1) renumbering the three GOBs from the digital input video signals to be combined in accordance with a predetermined mapping relationship between the three GOBs in each of the QCIF input signal to the twelve GOBs in the CIF output signal; and (2) forming a frame of the digital output signal by time-division multiplexing the GOBs from each of the input signals to be combined according to the renumbered GOBs.

9. The method of claim 7 wherein the four QCIF digital input video signals combined into a CIF digital output video signal are selected from a plurality of greater than four QCIF digital input video signals.

10. The method of claim 9 wherein a plurality of CIF digital output video signals are formed by selecting for combining different four QCIF digital input video signals from the plurality of greater than four QCIF digital input video signals.

11. The method of claim 7 wherein the associated temporal reference number of each CIF frame of the digital output video signal is equal to the mapped temporal reference number of the QCIF frames of the digital input video signals that are combined in step (c).

12. Apparatus for combining segments of plural input signals having temporal reference numbers associated with each segment into an output signal having segments and associated temporal reference numbers, said apparatus comprising:

means for offsetting the temporal reference number of each segment in each input signal by an initial number associated with each input signal;

means for mapping the offset temporal reference number of each segment in each input signal onto a scale of temporal reference numbers having selected predetermined possible temporal reference numbers that are common to all the input signals; and means for combining segments from the input signals that have a same mapped temporal reference number into a segment of the output signal, the segment of the output signal having its associated temporal reference number determined from the same mapped temporal reference number of the segments of the input signals that are combined.

13. Apparatus in accordance with claim claim 12 wherein the associated temporal reference number of each segment of the output signal is equal to the mapped temporal reference number of the segments of the input signals that are combined by said means for combining.

14. Apparatus for combining plural input video signals having temporal reference numbers associated with predetermined time-segments of each input video signal into an output video signal having time-segments and associated temporal reference numbers, said apparatus comprising:

means for offsetting the temporal reference number of each time-segment of each input video signal by an initial number associated with each input video signal;

means for mapping the offset temporal reference number of each time-segment of each input video signal onto a scale of temporal reference numbers having selected predetermined possible temporal reference numbers that are common to all the input video signals; and means for combining time-segments from the input video signals that have the same mapped temporal reference number into a time-segment of the output video signal, the time-segment of the output video signal having its associated temporal reference number determined from the same mapped temporal reference number of the segments of the input video signals that are combined.

15. Apparatus in accordance with claim 14 wherein the associated temporal reference number of each time-segment of the output video signal is equal to the mapped temporal reference number of the time-segments of the input video signals that are combined by said means for combining.

16. Apparatus for combining plural digital input video signals having temporal reference numbers associated with frames of each digital input video signal into a digital video output signal having frames and associated temporal reference numbers, said apparatus comprising:

means for offsetting the temporal reference number of each frame in each digital input video signal by an initial number associated with each digital input video signal;

means for mapping the offset temporal reference number of each frame in each digital input video signal onto a scale of temporal reference numbers having selected predetermined possible temporal reference numbers that are common to all the digital input video signals; and means for combining frames from the digital input video signals having the same mapped temporal reference number into a frame of the digital output video signal, the frame of the digital output signal having its associated temporal reference number determined from the same mapped temporal reference number of the frames of the digital input video signals that are combined.

17. Apparatus in accordance with claim 16 wherein the associated temporal reference number of each frame of the digital output video signal is equal to the mapped temporal reference number of the frames of the digital input video signals that are combined by said means for combining.

18. Apparatus for combining four Quarter Common Intermediate Format (QCIF) digital input video signals having three numbered groups of blocks (GOBs) of data per video frame into a Common Intermediate Format (CIF) digital output video signal having twelve numbered GOBs per video frame, each video frame in the digital output video signal having an associated temporal reference number, said apparatus comprising:

means for offsetting the temporal reference number of each frame in each digital input video signal by an initial number associated with each digital input video signal;

means for mapping the offset temporal reference number of each frame in each digital input video signal onto a scale of temporal reference numbers having selected predetermined possible temporal reference numbers that are common to all the digital input video signals; and means for combining frames from the digital input video signals having the same mapped temporal reference number into a frame of the digital output video signal, the frame of the digital output signal having its associated temporal reference number determined from the same mapped temporal reference number of the frames of the digital input video signals that are combined.

19. Apparatus in accordance with claim 18 wherein said means for combining comprises:

means for renumbering the three GOBs from the digital input video signals to be combined in accordance with a predetermined mapping relationship between the three GOBs in each of the QCIF input signal to the twelve GOBs in the CIF output signal; and means for forming a frame of the digital output signal by time-division multiplexing the GOBs from each of the input signals to be combined according to the renumbered GOBs.

20. Apparatus in accordance with claim 18 wherein the four QCIF digital input video signals combined into a CIF digital output video signal are selected from a plurality of greater than four QCIF digital input video signals.

21. Apparatus in accordance with claim 20 wherein a plurality of CIF digital output video signals are formed by selecting for combining different four QCIF digital input video signals from the plurality of greater than four QCIF digital input video signals.

22. Apparatus in accordance with claim 18 wherein the associated temporal reference number of each CIF frame of the digital output video signal is equal to the mapped temporal reference number of the QCIF flames of the digital input video signals that are combined by said means for combining.

* * * * *